Aug. 17, 1943.  L. R. BUCKENDALE  2,326,755
MULTISPEED DRIVE AXLE
Filed Oct. 3, 1941
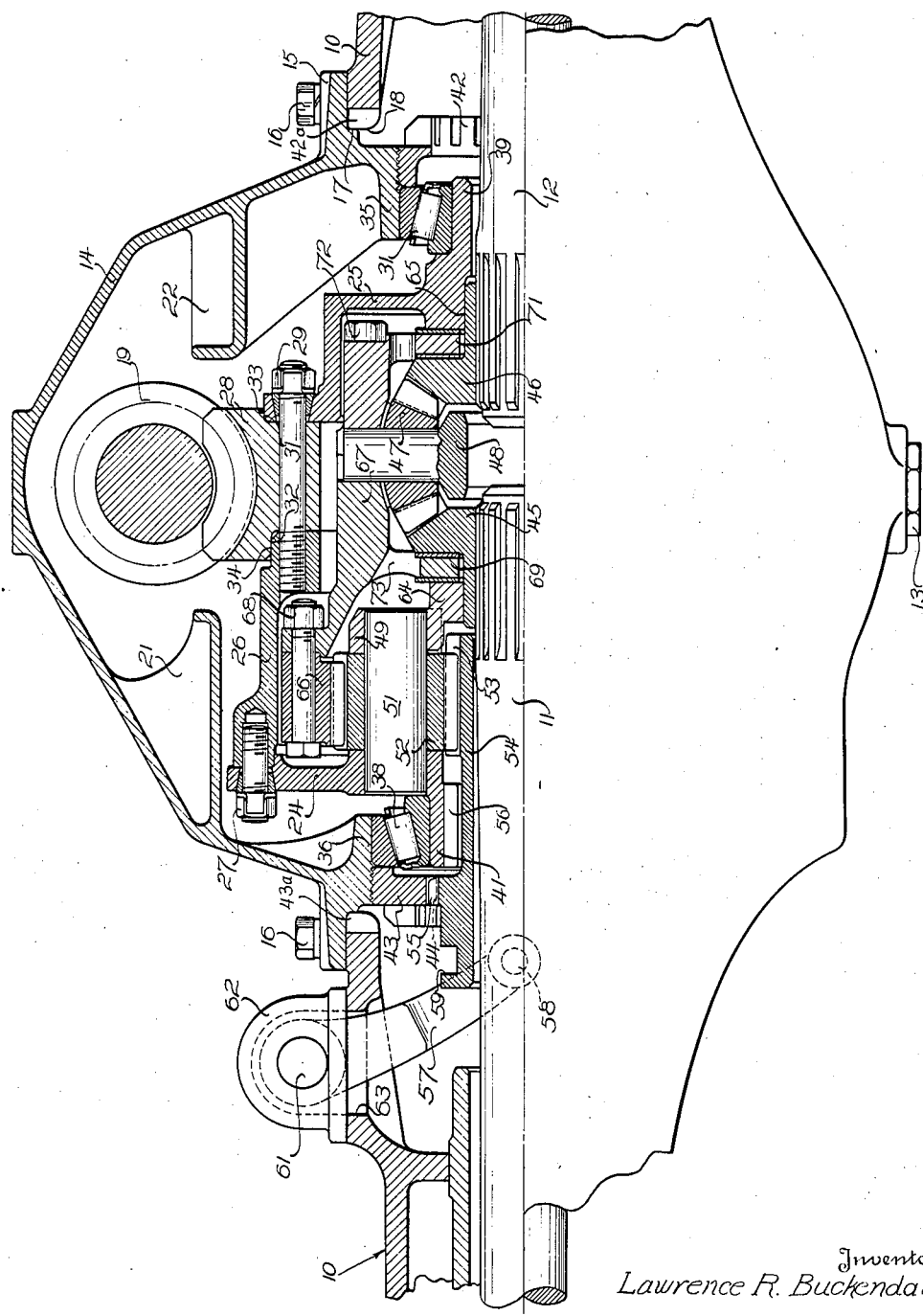
Inventor
Lawrence R. Buckendale
By Strauch & Hoffman
Attorneys Patented Aug. 17, 1943

2,326,755

UNITED STATES PATENT OFFICE 2,326,755

MULTISPEED DRIVE AXLE

Lawrence R. Buckendale, Detroit, Mich., assignor to The Timken-Detroit Axle Company, Detroit, Mich., a corporation of Ohio Application October 3, 1941, Serial No. 413,541

6 Claims. (Cl. 74—314)

The present invention relates to power transmitting mechanisms and is more particularly concerned with automotive and similar drive axles embodying multi-speed gear reducing mechanisms, although it is not limited to such use.

Single reduction worm drive axles have been in successful use for many years, due to their quietness of operation, the comparatively greatly increased speed reduction which is possible over that obtained with a bevel gear set of comparable size, and their long life and ability to stand up under extremely severe service conditions.

It is the major object of this invention to provide a drive axle having all of the advantages of the worm drive axles heretofore used, and the further important advantage of being selectively shiftable to decrease the speed ratio of the axle and afford more efficient operation under load and road conditions not requiring the full speed reduction of the worm drive, and yet retaining the highly desirable characteristics of quiet operation, ruggedness and durability.

A further important object is to provide a drive axle having a worm gear mechanism and a planetary overdrive mechanism arranged in series and operable to transmit power selectively at either the speed ratio of the worm gearing or at a ratio less than that of the worm gear mechanism.

Another object is to provide a drive axle, having a main housing, with an auxiliary housing carrying a unitary worm gear and planetary gear mechanisms and operable to transmit power from the drive shafts to the axle shafts.

A further object is to provide novel means for journalling the differential casing in the planetary rotor.

Further objects are to provide a multi-speed drive axle having a novel rotor and worm gear assembly, a novel speed selecting and shifting mechanism and to provide other subordinate improvements and refinements.

Further objects will become apparent as the specification proceeds in conjunction with the annexed drawing, and from the appended claims.

In the drawing the single figure is a longitudinal vertical section through a drive axle embodying the invention, the housing below the center line being shown in elevation to simplify the disclosure.

The axle embodies a main housing 10, having a pair of axle shafts 11 and 12 mounted for rotation therein in well-known manner and drivingly connected to vehicle wheels or other drive means (not shown). Housing member 10 is preferably made of a single casting, affording maximum strength, and is provided with a lubricant drain plug 13. Both the worm and planetary gear mechanisms are supported as a novel unitary assembly upon a carrier structure 14 having a flange 15 detachably secured to housing 10 by means of screws 16. Carrier 14 has a piloting surface 17 which cooperates with an opening 18 in the housing to accurately align the parts, the mating plane of the housing sections being disposed substantially parallel to the drive axles.

Mounted for rotation in spaced anti-friction bearings (not shown) in carrier 14 is a worm 19, to which power may be applied in any suitable manner, as for instance by means of the propeller shaft of an automotive vehicle. A pair of reservoirs 21 and 22 are preferably integrally formed in carrier 14 to collect the oil thrown from the worm during operation and feed it to the worm shaft bearings by way of suitable ducts (not shown).

By mounting the entire gear mechanism in novel unitary manner in the auxiliary housing as will now be described, an extremely simple yet rugged construction is provided and one which may be readily disassembled for servicing and repair.

Compactly disposed in carrier 14 is a rotor structure made up of a pair of end sections 24 and 25, and an intermediate section 26. Sections 24 and 26 are detachably secured together by stud and nut assemblies 27. Detachably clamped between sections 25 and 26 is a worm gear 28, which constantly meshes with worm 19. The parts are secured together by stud and nut assemblies 29, and in order to insure accurate centering of the gear, sections 25 and 26 are provided with accurately formed cylindrical piloting surfaces 31 and 32, respectively, which snugly fit mating surfaces 33 and 34 on gear 28.

The rotor structure is supported on the carrier by means of downwardly projecting cylindrical bearing mounts 35 and 36, which contain anti-friction bearings 37 and 38 cooperating with hub portions 39 and 41, respectively, formed on rotor sections 24 and 25. The bearings are adapted to be adjusted by ring members 42 and 43, threaded into the bearing supports, and having axially directed flanges coacting with the outer bearing races. Member 43 is also provided with a plurality of internal teeth 44 for a purpose that will presently appear. The bearing adjustment members are also provided with axially directed teeth, adapted to cooperate with a locking mechanism of any suitable character (not shown), whereby they may be rotated into any desired adjusted position and locked. The housing, adjacent opening 18, is provided with recesses 42a and 43a, which are vertically aligned with, and of sufficient width to receive the bearing adjustment rings 42 and 43, respectively, during assembly and disassembly.

The axle shafts are splined to differential side gears 45 and 46, which mesh with a plurality of differential miter gears 47 carried by a spider 48 in well known manner.

The rotor is, accordingly, driven by the constantly meshed worm and worm gear at a speed reduction, the ratio depending upon the pitch of the gears, it being understood that a ratio will be chosen to suit the requirements of the particular installation involved. Power is adapted to be selectively transmitted from the rotor assembly to the axle shafts at either a one-to-one ratio or at a speed increasing ratio, the latter giving an overall ratio less than that of the worm gearing, per se, so that under light load conditions more economical operation may be secured.

Tightly fitting in openings in rotor section 24 and also in a ring member 49, are a plurality of planet shafts 51. Ring 49 is rigidly secured to section 24 at circumferentially spaced points intermediate the planet shafts by matching bosses bolted in tight engagement in well-known manner (not shown).

Mounted upon each shaft 51 is a planet gear 52 which constantly meshes with sun gear teeth 53 formed on a sleeve or quill member 54. The quill is mounted for both axial and rotative movement in the housing and is provided with a second series of external teeth 55, which are adapted to be meshed with teeth 44 of bearing adjusting member 42 to lock the quill against rotation. Sun gear teeth 53 are also adapted to be selectively meshed with a set of teeth 56 formed inside hub 41 of the rotor for establishing a one-to-one ratio between the parts, as will presently appear.

The quill is adapted to be shifted into its various longitudinal positions by means of a yoke 57 having a pair of pins 58 riding in a groove 59 in the quill. Yoke 57 is mounted on a shaft 61 journalled in an auxiliary casing 62, detachably secured over an opening 63 in housing 10. Shaft 61 is adapted to be rocked by any suitable means, as for instance by means of a lever secured to the shaft.

Ring member 49 is provided with a hub portion 64 in which the hub of side gear 45 is journalled. The other side gear is journalled directly in a bearing 65 in rotor section 25.

The planet gears also constantly mesh with an internal gear 66 which is detachably secured to a casing 67 by means of bolt and nut assemblies 68. Casing 67 is rotatably mounted in novel manner as follows. The left hand end of the casing, through the intermediary of ring gear 66, floats upon the pitch lines of planet gears 52, and since the latter are three or more in number a stable support is afforded. The right hand end of the casing, by reason of spider 48 and miter gears 47 (which are also preferably three in number) floats upon the pitch lines of the side gears, which are journalled for accurate rotation in ring 64 and the hub 65 of rotor section 25. The casing accordingly freely floats in the rotor and is supported at widely spaced points. Endwise movement of the casing, and also side gears 45 and 46 is limited by means of webs 69 and 71 on the casing, which have thrust washers cooperating with ring 64, the hub of rotor section 25 and the backs of the side gears, it being understood that the openings in the webs are sufficiently large to avoid contact with the side gear hubs, so as to avoid interference with the floating mount of the casing.

Casing 67 is made in two parts, meeting along a plane transverse to the axle shafts, and detachably secured together by screws 72, it being understood that the arms of spider 48 are clamped in place between the halves of the casing, in well known manner. Journal portions 69 and 71 are also provided with a plurality of openings 73 and 74, respectively, for allowing lubricant to pass from the differential portion of the casing to the planetary gearing and opposite end portion of the casing, the lubricant preferably being introduced into the casing by a scoop mechanism of the character shown in my co-pending application for Drive axle, Serial No. 413,537, filed of even date herewith.

*Operation*

With the parts disposed in the position shown in the drawing, with planets 52 engaged with sun teeth 53, and with teeth 55 of the quill engaged with stationary teeth 44, rotation of worm 19, by means of any suitable prime mover, drives worm wheel 28 at reduced speed and the planetary rotor synchronously therewith. Rotation of the rotor, as just described, through rotor section 24, causes planet shafts 51 to travel in an orbit, carrying planets 52 with them. Travel of the planets in an orbit under the conditions just described causes them to planetate through their engagement with stationary sun gear teeth 53, and this results in their driving the orbit or ring gear 66 at an increased rate of speed or at an overdrive ratio. The power is in turn transmitted from the ring gear to casing 67, and the latter, through spider 48 and gears 47, divides the power between the two axle shafts. The overall ratio of the gearing is, accordingly, higher than that of the worm gearing alone, with the result that all the desirable operating characteristics of the worm drive are retained and in addition a higher speed ratio may be selectively obtained for more efficient operation under load and road conditions which do not require the greater gear reduction of the worm gear.

Assuming now that the quill is shifted to the left, sufficiently to disengage teeth 55 from stationary teeth 44, but insufficiently to engage sun gear teeth 53 with teeth 56 of the rotor, the parts are disposed in "neutral." Under these conditions rotation of the rotor does not result in transmission of power because travel of shaft 51 and planets 52 in an orbit merely results in their teeth idly meshing with sun gear teeth 53 and ring gear 66.

Assuming now that shaft 61 is rocked so as to shift the quill into its extreme left hand position, with sun gear teeth 53 meshing with internal teeth 56, but yet retaining partial engagement with the planets, the quill is locked to the rotor so as to rotate synchronously therewith and the quill locks the planets against rotation about their axes. Rotation of the rotor under these conditions, accordingly, causes the quill and the locked planets to rotate casing 67 synchronously with the rotor, at a one-to-one or direct drive ratio. Under these conditions, the full gear reduction of the worm gear mechanism is utilized.

It is to be understood that the shift into the various speed ratios may be effected in any desired manner. For instance, in an automotive vehicle, the power may be momentarily interrupted, as, for instance, by disengaging the vehicle clutch, or, if desired, any well known type of shift facilitating feature may be incorporated in the mechanism without impairing its action and enabling the shifts to be carried out without disengaging the vehicle clutch. If desired, the "easy shift" feature of the copending application of Nelson R. Brownyer, Serial No. 387,977, filed April 10, 1941, for Power transmission mechanism, may be employed without departing from the spirit of the invention.

Disassembly of the unit is readily effected by removing screws 16, so as to free the carrier, and removing casing 62 with its attached shaft and yoke assembly, the quill preferably being in its extreme left hand position during this operation. Axle shafts 11 and 12 are removed, either before or after the operations just described so as to leave the rotor unattached to any other part of the device. The quill is then shifted into its extreme right-hand position and the carrier is lifted, so as to cause the teeth of rings 42 and 43 to pass through recesses 42a and 43a. Upon contact of the end of the quill with the inner wall of the housing adjacent teeth 43a, the carrier assembly is rocked counterclockwise so as to clear the right hand end and the assembly then lifted clear of the housing. The unitary carrier, worm gear and rotor may then be completely disassembled on the bench by removing the lower halves of bearing supports 35 and 36 (not shown). The mating planes of the sections of casing 67 and the rotor are closely adjacent each other, so that upon separation their entire interiors are accessible.

From the foregoing detailed disclosure of the invention, it is apparent that there is provided a compact, efficient power transmitting mechanism of simple and rugged construction providing a worm drive and embodying a two-speed planetary gear mechanism affording a wide range of speed ratios, making possible the full utilization of the speed reduction of the worm drive under heavy load conditions, and which may be readily shifted to decrease the torque multiplying action of the worm gearing and afford more efficient operation under lighter loading conditions, the advantageous operating characteristics of the worm gearing being retained at all times.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a drive axle, a housing having a pair of aligned axle shafts rotatable therein; a hollow rotor and a casing mounted for concentric rotation about the axis of said axle shafts, said rotor being split transversely of said axle shafts into a cylindrical central section and a pair of end sections; a worm gear detachably clamped between said central section and one of said end sections, said casing also being split transversely of said axle shafts into two sections, a differential mechanism in said casing and having a spider secured between said casing sections, said differential mechanism being accessible for disassembly upon separation of said casing sections; and planetary mechanism for selectively transmitting power from said rotor to said casing at two different speed ratios housed within said central section and accessible upon separation of the other of said end sections from said central section.

2. The drive axle defined in claim 1, wherein said one rotor end section is joined to said gear along a plane adjacent the transverse split in said casing.

3. In a power transmitting mechanism, a housing; a rotor journalled for rotation about a fixed axis in said housing and carrying a plurality of circumferentially spaced shafts; a planet gear on each of said shafts; a pair of differential side gears mounted for independent rotation in said rotor; a casing structure disposed in said rotor and rigidly carrying at one end an orbit gear meshing with said planet gears; and a spider carrying miter gears meshing with said side gears and secured adjacent the other end of said casing, said orbit gear being operable to ride on the pitch circles of said planet gears and constituting the sole rotatable support for said one end of said casing.

4. The power transmitting mechanism defined in claim 3, wherein said miter gears are adapted to ride on the pitch circles of said side gears and constitute the sole rotatable support for said other end of said casing.

5. The power transmitting mechanism defined in claim 3, together with means for limiting axial movement of said casing in either direction.

6. In a drive axle, a housing having a pair of aligned drive axles rotatable therein carrying side gears at their neighboring ends; a rotor mounted for rotation in said housing about the axis of said axles and adapted to have power applied thereto; a plurality of circumferentially spaced shafts projecting from said rotor and each rotatably supporting a planet gear; a casing in said rotor having an internal gear at one end meshing with said planet gears and having a spider adjacent the other end carrying miter gears meshing with said side gears, the latter and said planet gears constituting the sole rotatable support for said casing; and a pair of axially spaced shoulders on said casing engaging opposing faces on said rotor, for limiting relative axial movement of said casing and rotor, and also engaging axially directed faces on said side gears for limiting movement thereof away from each other.

LAWRENCE R. BUCKENDALE.